(12) United States Patent
Henry et al.

(10) Patent No.: US 7,302,551 B2
(45) Date of Patent: *Nov. 27, 2007

(54) SUPPRESSION OF STORE CHECKING

(75) Inventors: G. Glenn Henry, Austin, TX (US);
Rodney E. Hooker, Austin, TX (US);
Terry Parks, Austin, TX (US)

(73) Assignee: IP-First, LLC, Fremont, CA (US)

( * ) Notice: Subject to any disclaimer, the term of this patent is extended or adjusted under 35 U.S.C. 154(b) by 448 days.

This patent is subject to a terminal disclaimer.

(21) Appl. No.: 10/283,397

(22) Filed: Oct. 29, 2002

(65) Prior Publication Data

US 2003/0188131 A1    Oct. 2, 2003

Related U.S. Application Data

(60) Provisional application No. 60/369,689, filed on Apr. 2, 2002.

(51) Int. Cl.
*G06F 9/312* (2006.01)
*G06F 9/318* (2006.01)
(52) U.S. Cl. .................... 712/203; 712/203
(58) Field of Classification Search ......... 712/203, 712/213
See application file for complete search history.

(56) References Cited

U.S. PATENT DOCUMENTS

| | | | |
|---|---|---|---|
| 3,657,705 A | 4/1972 | Mekota et al. | |
| 4,064,554 A * | 12/1977 | Tubbs | 712/226 |
| 4,217,638 A | 8/1980 | Namimoto et al. | |
| 4,547,849 A | 10/1985 | Louie et al. | |
| 5,029,069 A * | 7/1991 | Sakamura | 712/234 |
| 5,142,679 A | 8/1992 | Owaki et al. | |
| 5,448,744 A * | 9/1995 | Eifert et al. | 712/40 |
| 5,471,595 A | 11/1995 | Yagi et al. | |

(Continued)

FOREIGN PATENT DOCUMENTS

CN    1431584    7/2003

(Continued)

OTHER PUBLICATIONS

Paap et al, "Power PC™: A Performance Architecture," COMPCON Spring '93, Digest of Papers, San Francisco, CA, IEEE Computer Society, Feb. 22, 1993, pp. 104-108.

(Continued)

*Primary Examiner*—Daniel Pan
(74) *Attorney, Agent, or Firm*—Richard K. Huffman; James W. Huffman

(57) ABSTRACT

An apparatus and method are provided for extending a microprocessor instruction set to allow for selective suppression of store checking at the instruction level. The apparatus includes fetch logic, and translation logic. The fetch logic receives an extended instruction. The extended instruction has an extended prefix and an extended prefix tag. The extended prefix specifies that store checking be suppressed for the extended instruction. The extended prefix tag is an otherwise architectural opcode within an existing instruction set. The fetch logic precludes store checking for pending store events associated with the extended instruction. The translation logic is coupled to the fetch logic. The translation logic translates the extended instruction into a micro instruction sequence that sequence directs the microprocessor to exclude store checking during execution of a prescribed operation.

21 Claims, 7 Drawing Sheets

Extended Instruction Format

U.S. PATENT DOCUMENTS

| | | | |
|---|---|---|---|
| 5,481,684 A | 1/1996 | Richter et al. | |
| 5,687,338 A | 11/1997 | Boggs et al. | |
| 5,751,996 A | 5/1998 | Glew et al. | |
| 5,768,574 A * | 6/1998 | Dutton et al. | 712/226 |
| 5,778,220 A | 7/1998 | Abramson et al. | |
| 5,796,973 A | 8/1998 | Witt et al. | |
| 5,822,778 A | 10/1998 | Dutton et al. | |
| 5,826,089 A | 10/1998 | Ireton | |
| 5,857,103 A | 1/1999 | Grove | |
| 5,875,342 A | 2/1999 | Temple | |
| 5,913,049 A | 6/1999 | Shiell et al. | |
| 5,937,199 A | 8/1999 | Temple | |
| 5,991,872 A | 11/1999 | Shiraishi et al. | |
| 6,014,735 A | 1/2000 | Chennupaty et al. | |
| 6,029,222 A | 2/2000 | Kamiya | |
| 6,058,472 A | 5/2000 | Panwar et al. | |
| 6,085,312 A | 7/2000 | Abdallah et al. | |
| 6,157,996 A | 12/2000 | Christie et al. | |
| 6,199,155 B1 | 3/2001 | Kishida et al. | |
| 6,230,259 B1 | 5/2001 | Christie et al. | |
| 6,317,822 B1 | 11/2001 | Padwekar | |
| 6,351,806 B1 | 2/2002 | Wyland | |
| 6,434,693 B1 | 8/2002 | Senter et al. | |
| 6,456,891 B1 | 9/2002 | Kranich et al. | |
| 6,549,999 B2 | 4/2003 | Kishida et al. | |
| 6,560,694 B1 | 5/2003 | McGrath et al. | |
| 6,647,488 B1 | 11/2003 | Takeno et al. | |
| 6,823,414 B2 | 11/2004 | Radhakrishna | |
| 6,883,053 B2 | 4/2005 | Shinagawa et al. | |
| 2001/0013870 A1 | 8/2001 | Pentkovski et al. | |
| 2002/0194457 A1 | 12/2002 | Akkary | |
| 2003/0159020 A1* | 8/2003 | Henry et al. | 712/209 |
| 2003/0172252 A1* | 9/2003 | Henry et al. | 712/210 |
| 2003/0188131 A1 | 10/2003 | Henry et al. | |
| 2005/0102492 A1 | 5/2005 | Henry et al. | |
| 2005/0188179 A1 | 8/2005 | Henry et al. | |

FOREIGN PATENT DOCUMENTS

| | | |
|---|---|---|
| EP | 0550289 A | 7/1993 |
| EP | 0942359 A | 9/1999 |
| EP | 0947919 A | 10/1999 |
| WO | WO-9722922 A1 | 6/1997 |

OTHER PUBLICATIONS

Intel Architecture Software Developer's Manual, vol. 2: Instruction Set Reference, 1999. pp. 2-1 to 2-4, 3-332, 3-353 and 825.

Silberman et al. *An Architectural Framework for Supporting Heterogeneous Instruction-Set Architectures.* Computer, IEEE Computer Society, Long Beach, CA. US vol. 26, No. 6 Jun. 1, 1993. pp. 39-56. ISSN: 0018-0162.

* cited by examiner

Fig. 1 (Related Art)

*Microprocessor Instruction Format*

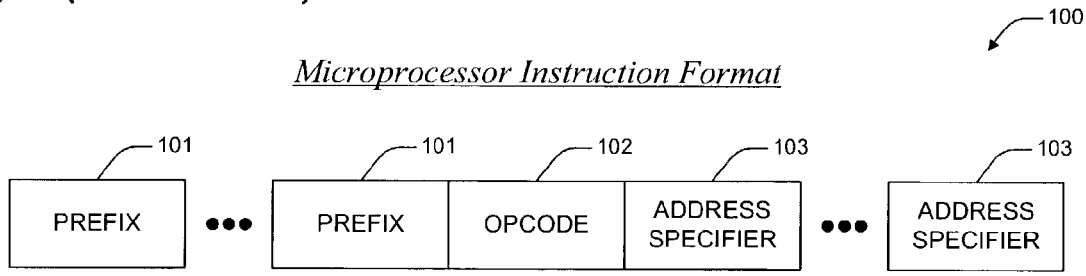

Fig. 2 (Related Art)

*8-Bit Opcode Map*

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | I00 | I01 | I02 | I03 | I04 | I05 | I06 | I07 | I08 | I09 | I0A | I0B | I0C | I0D | I0E | I0F |
| 1 | I10 | I11 | I12 | I13 | I14 | I15 | I16 | I17 | I18 | I19 | I1A | I1B | I1C | I1D | I1E | I1F |
| 2 | I20 | I21 | I22 | I23 | I24 | I25 | I26 | I27 | I28 | I29 | I2A | I2B | I2C | I2D | I2E | I2F |
| 3 | I30 | I31 | I32 | I33 | I34 | I35 | I36 | I37 | I38 | I39 | I3A | I3B | I3C | I3D | I3E | I3F |
| 4 | I40 | I41 | I42 | I43 | I44 | I45 | I46 | I47 | I48 | I49 | I4A | I4B | I4C | I4D | I4E | I4F |
| 5 | I50 | I51 | I52 | I53 | I54 | I55 | I56 | I57 | I58 | I59 | I5A | I5B | I5C | I5D | I5E | I5F |
| 6 | I60 | I61 | I62 | I63 | I64 | I65 | I66 | I67 | I68 | I69 | I6A | I6B | I6C | I6D | I6E | I6F |
| 7 | I70 | I71 | I72 | I73 | I74 | I75 | I76 | I77 | I78 | I79 | I7A | I7B | I7C | I7D | I7E | I7F |
| 8 | I80 | I81 | I82 | I83 | I84 | I85 | I86 | I87 | I88 | I89 | I8A | I8B | I8C | I8D | I8E | I8F |
| 9 | I90 | I91 | I92 | I93 | I94 | I95 | I96 | I97 | I98 | I99 | I9A | I9B | I9C | I9D | I9E | I9F |
| A | IA0 | IA1 | IA2 | IA3 | IA4 | IA5 | IA6 | IA7 | IA8 | IA9 | IAA | IAB | IAC | IAD | IAE | IAF |
| B | IB0 | IB1 | IB2 | IB3 | IB4 | IB5 | IB6 | IB7 | IB8 | IB9 | IBA | IBB | IBC | IBD | IBE | IBF |
| C | IC0 | IC1 | IC2 | IC3 | IC4 | IC5 | IC6 | IC7 | IC8 | IC9 | ICA | ICB | ICC | ICD | ICE | ICF |
| D | ID0 | ID1 | ID2 | ID3 | ID4 | ID5 | ID6 | ID7 | ID8 | ID9 | IDA | IDB | IDC | IDD | IDE | IDF |
| E | IE0 | IE1 | IE2 | IE3 | IE4 | IE5 | IE6 | IE7 | IE8 | IE9 | IEA | IEB | IEC | IED | IEE | IEF |
| F | IF0 | IF1 | IF2 | IF3 | IF4 | IF5 | IF6 | IF7 | IF8 | IF9 | IFA | IFB | IFC | IFD | IFE | IFF |

Fig. 3

*Extended Instruction Format*

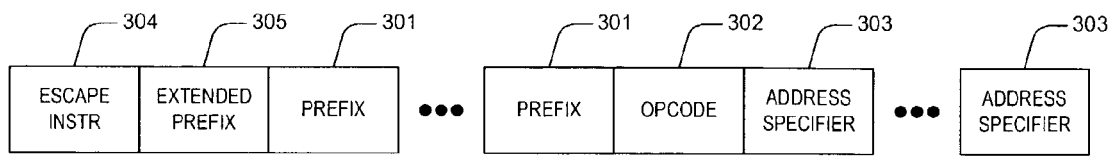

Fig. 4

*8-Bit Extended Prefix Map*

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | E00 | E01 | E02 | E03 | E04 | E05 | E06 | E07 | E08 | E09 | E0A | E0B | E0C | E0D | E0E | E0F |
| 1 | E10 | E11 | E12 | E13 | E14 | E15 | E16 | E17 | E18 | E19 | E1A | E1B | E1C | E1D | E1E | E1F |
| 2 | E20 | E21 | E22 | E23 | E24 | E25 | E26 | E27 | E28 | E29 | E2A | E2B | E2C | E2D | E2E | E2F |
| 3 | E30 | E31 | E32 | E33 | E34 | E35 | E36 | E37 | E38 | E39 | E3A | E3B | E3C | E3D | E3E | E3F |
| 4 | E40 | E41 | E42 | E43 | E44 | E45 | E46 | E47 | E48 | E49 | E4A | E4B | E4C | E4D | E4E | E4F |
| 5 | E50 | E51 | E52 | E53 | E54 | E55 | E56 | E57 | E58 | E59 | E5A | E5B | E5C | E5D | E5E | E5F |
| 6 | E60 | E61 | E62 | E63 | E64 | E65 | E66 | E67 | E68 | E69 | E6A | E6B | E6C | E6D | E6E | E6F |
| 7 | E70 | E71 | E72 | E73 | E74 | E75 | E76 | E77 | E78 | E79 | E7A | E7B | E7C | E7D | E7E | E7F |
| 8 | E80 | E81 | E82 | E83 | E84 | E85 | E86 | E87 | E88 | E89 | E8A | E8B | E8C | E8D | E8E | E8F |
| 9 | E90 | E91 | E92 | E93 | E94 | E95 | E96 | E97 | E98 | E99 | E9A | E9B | E9C | E9D | E9E | E9F |
| A | EA0 | EA1 | EA2 | EA3 | EA4 | EA5 | EA6 | EA7 | EA8 | EA9 | EAA | EAB | EAC | EAD | EAE | EAF |
| B | EB0 | EB1 | EB2 | EB3 | EB4 | EB5 | EB6 | EB7 | EB8 | EB9 | EBA | EBB | EBC | EBD | EBE | EBF |
| C | EC0 | EC1 | EC2 | EC3 | EC4 | EC5 | EC6 | EC7 | EC8 | EC9 | ECA | ECB | ECC | ECD | ECE | ECF |
| D | ED0 | ED1 | ED2 | ED3 | ED4 | ED5 | ED6 | ED7 | ED8 | ED9 | EDA | EDB | EDC | EDD | EDE | EDF |
| E | EE0 | EE1 | EE2 | EE3 | EE4 | EE5 | EE6 | EE7 | EE8 | EE9 | EEA | EEB | EEC | EED | EEE | EEF |
| F | EF0 | EF1 | EF2 | EF3 | EF4 | EF5 | EF6 | EF7 | EF8 | EF9 | EFA | EFB | EFC | EFD | EFE | EFF |

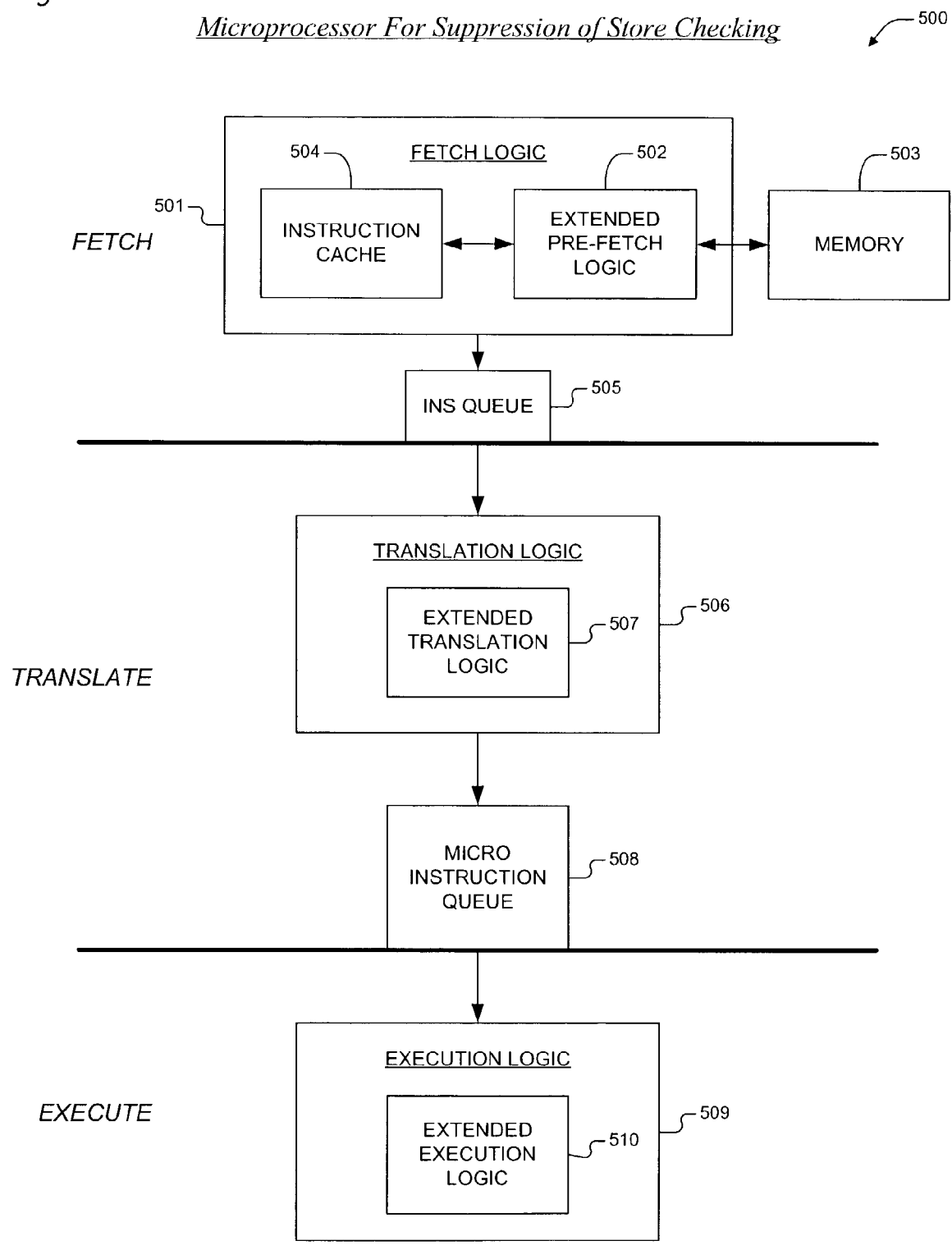

*Extended Prefix for Suppression of Store Checking*

*Translate Stage Details*

Execute Stage Details

SUPPRESSION OF STORE CHECKING

CROSS-REFERENCE TO RELATED APPLICATIONS

This application claims the benefit of U.S. Provisional Application No. 60/369,689 filed on Apr. 2, 2002.

This application is related to the following U.S. Patent Applications, all of which have a common assignee and common inventors.

| SERIAL NUNBER | FILING DATE | DOCKET NUMBER | TITLE |
|---|---|---|---|
| 10/144595 | May 9, 2002 | CNTR.2176 | APPARATUS AND METHOD FOR EXTENDING A MICROPROCESSOR INSTRUCTION SET |
| 10/144592 | May 9, 2002 | CNTR.2186 | APPARATUS AND METHOD FOR CONDITIONAL INSTRUCTION EXECUTION |
| 10/227572 | Aug. 22, 2002 | CNTR.2187 | SUPPRESSION OF STORE CHECKING |
| 10/144593 | May 9, 2002 | CNTR.2188 | APPARATUS AND METHOD FOR SELECTIVE CONTROL OF CONDITION CODE WRITE BACK |
| 10/144590 | May 9, 2002 | CNTR.2189 | MECHANISM FOR EXTENDING THE NUMBER OF REGISTERS IN A MICROPROCESSOR |
| 10/227008 | Aug. 22, 2002 | CNTR.2190 | APPARATUS AND METHOD FOR EXTENDING DATA MODES IN A MICROPROCESSOR |
| 10/227571 | Aug. 22, 2002 | CNTR.2191 | APPARATUS AND METHOD FOR EXTENDING ADDRESS MODES IN A MICROPROCESSOR |
|  |  | CNTR.2193 | SELECTIVE INTERRUPT SUPPRESSION |
| 10/227583 | Aug. 22, 2002 | CNTR.2195 | NON-TEMPORAL MEMORY REFERENCE CONTROL MECHANISM |
| 10/144589 | May 9, 2002 | CNTR.2198 | APPARATUS AND METHOD FOR SELECTIVE CONTROL OF RESULTS WRITE BACK |

BACKGROUND OF THE INVENTION

1. Field of the Invention

This invention relates in general to the field of microelectronics, and more particularly to a technique for incorporating selective suppression of store checking features at the instruction level into an existing microprocessor instruction set architecture.

2. Description of the Related Art

Since microprocessors were fielded in the early 1970's, their use has grown exponentially. Originally applied in the scientific and technical fields, microprocessor use has moved over time from those specialty fields into commercial consumer fields that include products such as desktop and laptop computers, video game controllers, and many other common household and business devices.

Along with this explosive growth in use, the art has experienced a corresponding technology pull that is characterized by an escalating demand for increased speed, expanded addressing capabilities, faster memory accesses, larger operand size, more types of general purpose operations (e.g., floating point, single-instruction multiple data (SIMD), conditional moves, etc.), and added special purpose operations (e.g., digital signal processing functions and other multi-media operations). This technology pull has resulted in an incredible number of advances in the art which have been incorporated in microprocessor designs such as extensive pipelining, super-scalar architectures, cache structures, out-of-order processing, burst access mechanisms, branch prediction, and speculative execution. Quite frankly, a present day microprocessor is an amazingly complex and capable machine in comparison to its 30-year-old predecessors.

But unlike many other products, there is another very important factor that has constrained, and continues to constrain, the evolution of microprocessor architecture. This factor—legacy compatibility—accounts for much of the complexity that is present in a modern microprocessor. For market-driven reasons, many producers have opted to retain all of the capabilities that are required to insure compatibility with older, so-called legacy application programs as new designs are provided which incorporate new architectural features.

Nowhere has this legacy compatibility burden been more noticeable than in the development history of x86-compatible microprocessors. It is well known that a present day virtual-mode, 32-/16-bit x86 microprocessor is still capable of executing 8-bit, real-mode, application programs which were produced during the 1980's. And those skilled in the art will also acknowledge that a significant amount of corresponding architectural "baggage" is carried along in the x86 architecture for the sole purpose of retaining compatibility with legacy applications and operating modes. Yet while in the past developers have been able to incorporate newly developed architectural features into existing instruction set architectures, the means whereby use of these features is enabled—programmable instructions—have become scarce. More specifically, there are no "spare" instructions in certain instruction sets of interest that provide designers with a way to incorporate newer features into an existing architecture.

In the x86 instruction set architecture, for example, there are no remaining undefined 1-byte opcode states. All 256 opcode values in the primary 1-byte x86 opcode map are taken up with existing instructions. As a result, x86 microprocessor designers today must choose either to provide new features or to retain legacy compatibility. If new programmable features are to be provided, then they must be assigned to opcode values in order for programmers to exercise those features. And if spare opcode values do not remain in an existing instruction set architecture, then some of the existing opcode values must be redefined to provide for specification of the new features. Thus, legacy compatibility is sacrificed in order to make way for new feature growth.

There are a number of features that programmers desire in a present day microprocessor, but which have heretofore been precluded from incorporation because of the aforementioned reasons. One particular feature that is desirable for incorporation is store check suppression control at the instruction level.

Since virtually all microprocessors utilize multi-stage pipeline architectures, it is possible—indeed probable—that an instruction which is being fetched into the pipeline may very well be the target of a pending store operation that is proceeding through to completion in later stages of the pipeline, but which has not yet been completed. That is, the data to be stored to a destination location has not yet been written to memory (that is, external memory or internal cache). This situation can exist under many different conditions. For example, the store instruction may be proceeding through an earlier pipeline stage that is not dedicated to writing memory. Alternatively, the data may have been placed in a pending store buffer that is waiting for a convenient time to write to memory, while the store instruction was allowed to exit the pipeline. One skilled in the art will appreciate that pipeline architectures present various challenges to microprocessor designers that relate to the synchronization of instructions which are programmed for sequential execution, but which are executed in part by parallel operations in an pipeline fashion.

Store checking is an inherent feature of all pipeline microprocessors that is provided to insure that all instructions resident within in a microprocessor pipeline are indeed the instructions intended for execution by the application programmer. Apparatus and means are provided within these processors' pipelines to check all instructions proceeding into the pipeline against pending store events that have yet to post in memory, and furthermore to check all instructions in preceding pipeline stages against the destination addresses of store instructions when those instructions are executed. If a pending store event is detected whose destination address corresponds (corresponding generally with cache line granularity) to the location of an incoming instruction, then the pipeline is stalled and the store is allowed to post to memory. When the pipeline is stalled, the progression of instructions through the various pipeline stages is halted until the stall is removed. Following posting of the data, the incoming instruction is again fetched from its location and is allowed to proceed through the pipeline. During execution of a store instruction, if an instruction is detected in a previous pipeline stage whose location (i.e., its instruction pointer (IP)) corresponds to the destination address of the store instruction, then synchronization hardware in the microprocessor stalls the pipeline and flushes all pipeline stages above and up through the previous pipeline stage containing the detected instruction. After the store instruction writes its data, then the pipeline is refilled.

Store checking is an incredibly onerous task, requiring hardware that is proportional to the number of pipeline stages in a microprocessor. This is the reason why store destinations and instruction locations, as alluded to above, are typically checked only with cache line granularity. Furthermore, because of the complexities inherent in the translation of virtual to physical addresses, store checking is also generally accomplished using virtual addresses rather than physical addresses.

At present, a programmer has no control over store checking features in a microprocessor. If the programmer chooses to employ self-modifying code techniques, then he/she must insure that subsequent instructions which are the store targets of previous store operations are indeed desired for execution of the corresponding application program. At the source code level, this can be accomplished, although such a programming technique may not be desirable. Yet, a microprocessor does not execute source code. Automated compilers generate the instruction stream for microprocessors from the provided source code. And the resulting instruction stream may very well contain interlaced code and data within the same cache line due to alignment properties of a given compiler. Hence, even though a programmer has provided means for ensuring the coherency of self-modifying source code, pipeline synchronization events may be disadvantageously introduced as a result of code compilation.

A programmer, for various performance reasons, may desire to precede an instruction with a store that modifies the instruction's location, but the desired execution sequence is that the former contents of the location be executed. This is presently not possible because store checking mechanisms preclude such a sequence of execution events.

Therefore, what is needed is an apparatus and method that incorporate suppression of store checking features into an existing microprocessor architecture having a completely full opcode set, where incorporation of the suppression features allow a conforming microprocessor to retain the capability to execute legacy application programs while concurrently providing application programmers and/or compilers with the capability to control whether or not store checking is performed on any given instruction.

SUMMARY OF THE INVENTION

The present invention, among other applications, is directed to overcoming these and other problems and disadvantages of the prior art. The present invention provides a superior technique for extending a microprocessor instruction set beyond its current capabilities to provide for instruction-level store checking suppression features. In one embodiment an apparatus provides for instruction level control of store checking within a microprocessor. The apparatus includes fetch logic, and translation logic. The fetch logic receives an extended instruction. The extended instruction has an extended prefix and an extended prefix tag. The extended prefix specifies that store checking be suppressed for the extended instruction. The extended prefix tag is an otherwise architectural opcode within an existing instruction set. The fetch logic precludes store checking for pending store events associated with the extended instruction. The translation logic is coupled to the fetch logic. The translation logic translates the extended instruction into a micro instruction sequence that directs the microprocessor to exclude store checking during execution of a prescribed operation.

One aspect of the present invention contemplates a microprocessor mechanism, for extending an existing instruction set to provide for selective suppression of store checking within a microprocessor pipeline. The microprocessor mechanism has an extended instruction and a translator. The extended instruction prescribes that store checking associated with the extended instruction be suppressed, where the extended instruction includes a selected opcode in the existing instruction set followed by an n-bit extended prefix. The selected opcode indicates the extended instruction, and the n-bit extended prefix indicates suppression of store checking. The translator receives the extended instruction, and generates a micro instruction sequence directing a microprocessor to execute a prescribed operation and to preclude store checking associated with execution of the prescribed operation.

Another aspect of the present invention comprehends an apparatus, for adding instruction store checking suppression features to an existing instruction set. The apparatus has an escape tag, a store check suppression specifier, translation logic, and extended execution logic. The escape tag is received by fetch logic, and indicates that accompanying parts of a corresponding instruction prescribe an operation to be performed, where the escape tag is a first opcode within the existing instruction set. The store check suppression specifier is coupled to the escape tag and is one of the accompanying parts. The store check suppression specifier prescribes that store checking be suppressed through completion of the operation. The translation logic is coupled to the fetch logic. The translation logic generates a micro instruction sequence directing a microprocessor to execute the operation, and specifies within the micro instruction sequence that store checking be suppressed. The extended execution logic is coupled to the translation logic. The extended execution logic receives the micro instruction sequence, and executes the operation exclusive of performing store checking.

A further aspect of the present invention provides a method for extending an existing instruction set architecture to provide for suppression of store checking at the instruction level. The method includes providing an extended instruction, the extended instruction including an extended tag along with an extended prefix, where the extended tag is a first opcode entity according to the existing instruction set architecture; prescribing, via the extended prefix, that store checking be suppressed for execution of the extended instruction, where remaining parts of the extended instruction prescribe an operation to be performed; and suppressing store checking associated with the extended instruction.

BRIEF DESCRIPTION OF THE DRAWINGS

These and other objects, features, and advantages of the present invention will become better understood with regard to the following description, and accompanying drawings where:

FIG. 1 is a block diagram illustrating a related art microprocessor instruction format;

FIG. 2 is a table depicting how instructions in a instruction set architecture are mapped to logic states of bits in an 8-bit opcode byte within the instruction format of FIG. 1;

FIG. 3 is a block diagram featuring an extended instruction format according to the present invention;

FIG. 4 is a table showing how extended architectural features are mapped to logic states of bits in an 8-bit extended prefix embodiment according to the present invention;

FIG. 5 is a block diagram illustrating a pipeline microprocessor for employing selective store checking suppression control according to the present invention;

DETAILED DESCRIPTION

Figure 6:
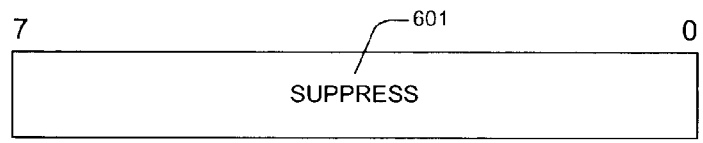
FIG. 6 is a block diagram featuring one embodiment of an extended prefix for prescribing that store checking be precluded in a microprocessor according to the present invention.

The following description is presented to enable one of ordinary skill in the art to make and use the present invention as provided within the context of a particular application and its requirements. Various modifications to the preferred embodiment will, however, be apparent to one skilled in the art, and the general principles discussed herein may be applied to other embodiments. Therefore, the present invention is not intended to be limited to the particular embodiments shown and described herein, but is to be accorded the widest scope consistent with the principles and novel features herein disclosed.

In view of the above background discussion on the techniques employed within present day microprocessors to extend the architectural features of those microprocessors beyond the capabilities of their associated instruction sets, a related art example will now be discussed with reference to FIGS. 1–2. The discussion highlights the instruction set limitations that microprocessor designers routinely face today. On the one hand, they desire to incorporate more recently developed architectural features into a microprocessor design and, on the other hand, market conditions dictate that they must retain the capability to execute legacy application programs. In the example of FIGS. 1–2, a completely defined opcode map rules out the possibility of defining new opcodes for the exemplary architecture. Thus, the designers are compelled to choose either to incorporate the new features and sacrifice legacy compatibility to some extent, or to forego more recent architectural advances altogether in favor of maintaining the ability to execute older application programs. Following the related art discussion, a discussion of the present invention will be provided with reference to FIGS. 3–11. By employing an existing, yet obsolete, opcode as a prefix tag for an extended instruction that follows, the present invention enables microprocessor designers to overcome the limitations of completely full instruction set architectures, thereby allowing them to provide programmers with the capability to selectively suppress store checking for an individual instruction or for groups of instructions while concurrently retaining all the features that are required to run legacy application programs.

Turning to FIG. 1, a block diagram is presented illustrating a related art microprocessor instruction format 100. The related art instruction 100 has a variable number of instruction entities 101–103, each set to a specified value, that together make up a specific instruction 100 for a microprocessor. The specific instruction 100 directs the microprocessor to perform a specific operation such as adding two operands together, or moving an operand from memory to an internal register or to memory from the internal register. In general, an opcode entity 102 within the instruction 100 prescribes the specific operation to be performed, and optional address specifier entities 103 follow the opcode 102 prescribing additional information about the specific operation such as how the operation is to be performed, where the operands are located, etc. The instruction format 100 additionally allows a programmer to prefix an opcode 102 with prefix entities 101. The prefixes 101 direct the application of specified architectural features during the execution of the specific operation prescribed by the opcode 102. Typically, these architectural features can be applied to most of the operations prescribed by any of the opcodes 102 in the instruction set. For example, prefixes 101 in many present day microprocessors direct operations to be executed using different operand sizes (e.g., 16-bit, 32-bit). Accordingly, these processors are programmed to a default operand size (say, 32-bit), and prefixes 101 are provided in their respective instruction sets enabling programmers to selectively override the default operand size (say, to generate 16-bit operands) on an instruction-by-instruction basis. Selectable operand size is merely one example of an architectural feature that spans a significant number of the operations (e.g., add, subtract, multiply, Boolean logic, etc.) prescribed by opcodes 102 within many present day microprocessors.

One well-known instance of the instruction format 100 shown in FIG. 1 is the x86 instruction format 100, which is employed by all present day x86-compatible microprocessors. More specifically, the x86 instruction format 100 (also known as the x86 instruction set architecture 100) uses 8-bit prefixes 101, 8-bit opcodes 102, and 8-bit address specifiers 103. The x86 architecture 100 has several prefixes 101 as well, two of which override default address and data sizes of an x86 microprocessor (i.e., opcode states 66H and 67H), another which directs the microprocessor to interpret a following opcode byte 102 according to alternative translation rules (i.e., prefix value 0FH, which causes translation to be performed according to the so-called 2-byte opcode rules), and other prefixes 101 which cause particular operations to be repeated until repetition criteria are satisfied (i.e., the REP opcodes: F2H and F3H).

Referring now to FIG. 2, a table 200 is presented depicting how instructions 201 in an instruction set architecture are mapped to values an 8-bit opcode byte 102 within the instruction format of FIG. 1. The table 200 presents an exemplary 8-bit opcode map 200 that associates up to 256 values of an 8-bit opcode entity 102 with corresponding microprocessor opcode instructions 201. The table 200 maps a particular value of an opcode entity 102, say value 02 H, to a corresponding instruction opcode 201 (i.e., instruction I02 201). In the particular case of the x86 opcode map, it is well known in the art that opcode value 14 H is mapped to the x86 Add With Carry (ADC) instruction opcode, which directs that an 8-bit immediate operand be added to the contents of architectural register AL. One skilled in the art will also appreciate that the x86 prefixes 101 alluded to above (i.e., 66 H, 67 H, 0 FH, F0 H, F2 H, and F3 H) are actually opcode values 201 that contextually specify the application of certain architectural extensions to the operation prescribed by a following opcode entity 102. For example, preceding opcode 14 H (normally, the ADC opcode discussed above) with prefix 0FH results in an x86 processor executing an Unpack And Interleave Low Packed Single-Precision Floating-Point Values (UNPCKLPS) operation instead of the Add With Carry (ADC). Features such as described in this x86 example are enabled in part in a present day microprocessor because instruction translation logic in the microprocessor interprets the entities 101–103 of an instruction 100 in order. Hence, the use of specific opcode values as prefixes 101 in instruction set architectures has, in past times, allowed microprocessor designers to incorporate a significant number of advanced architectural features into a complying microprocessor design without disadvantageously impacting the execution of older programs which do not employ those specific opcode states. For example, a legacy program that never uses x86 opcode 0 FH will still run on a present day x86 microprocessor. And a newer application program, by employing x86 opcode 0 FH as a prefix 101, can utilize a substantial number of x86 architectural features that have been more recently incorporated such as single instruction multiple data (SIMD) operations and conditional move operations.

The incorporation of architectural feature advances has been accomplished in the past through the designation of available (i.e. spare or unassigned) opcode values 201 as prefixes 101 (also known as architectural feature tags 101, feature indicators 101, or escape instructions 101). Yet, many instruction set architectures 100 have ceased to support the provision of enhancements for a very straightforward reason: all of the available or spare opcode values within those instruction sets 100 have been used up, that is, all of the opcode values in the opcode map 200 have been architecturally specified. When all of the available opcode values have been assigned as either opcode entities 102 or prefix entities 101, then there remain no more values to provide for the incorporation of new features. This significant problem exists in many microprocessor architectures today and consequently forces designers to choose between adding architectural features to a design and retaining compatibility with older programs.

It is notable that the instructions 201 shown in FIG. 2 are depicted generically (i.e., I24, I86) rather than specifically (i.e., Add With Carry, Subtract, Exclusive-OR). This is because fully occupied opcode maps 200 are presently precluding the incorporation of more recent architectural advances in a number of different microprocessor architectures. And although an 8-bit opcode entity 102 is alluded to in the example of FIG. 2, one skilled in the art will appreciate that the specific size of the opcode 102 is irrelevant in any sense other than its use as a specific case to teach the problem of a full opcode structure 200. Accordingly, a fully populated 6-bit opcode map would exhibit 64 architecturally defined opcodes 201 and prefixes 201 and would likewise provide no spare opcode values for expansion.

One alternative that stops short of entirely obliterating an existing instruction set and replacing it with a new format 100 and opcode map 200 is to substitute new instruction meanings for only a small subset of existing opcodes 201 that are presently used by application programs, say opcodes 40 H through 4 FH like those shown in FIG. 2. Under this hybrid technique, a conforming microprocessor operates exclusively in one of two operating modes: a legacy compatible mode, where opcodes 40 H–4 FH are interpreted according to legacy rules, or an enhanced mode, where opcodes 40 H–4 FH are interpreted according to enhanced architectural rules. This technique indeed enables designers to incorporate new features into a design, but when the conforming microprocessor is running in an enhanced mode it excludes execution of any application program that uses opcodes 40 H–4 FH. Hence, from the standpoint of retaining legacy compatibility, the legacy compatible-enhanced mode technique is not an optimum choice.

The present inventors, however, have noted the use frequency of certain opcodes 201 in instruction sets 200 having fully populated opcode spaces over the breadth of application programs composed for execution on compliant microprocessors. They have accordingly observed that there are some opcodes 202 which, although they are architecturally defined, are not employed within application programs that are capable of being executed by the microprocessors. Instruction IF1 202 is depicted in FIG. 2 as such an example of this singularity. In fact, the very same opcode value 202 (i.e., F1H) maps to a valid instruction 202 in the x86 instruction set architecture that is not presently employed by any extant application program. While the unused x86 instruction 202 is a valid x86 instruction 202 that directs an architecturally specified operation on an x86 microprocessor, it is not employed in any application program that can be executed on any present day x86 microprocessor. The particular x86 instruction 202 is known as In Circuit Emulation Breakpoint (i.e., ICE BKPT, opcode value F1H), and was formerly employed exclusively in a class of microprocessor emulation equipment that no longer exists today. ICE BKPT 202 was never employed in an application program outside of an in-circuit emulator, and the form of in-circuit emulation equipment that formerly employed ICE BKPT 202 no longer exists. Hence, in the x86 case, the present inventors have identified a means within a completely occupied instruction set architecture 200 whereby they can exploit a valid, yet obsolete, opcode 202 to allow for the incorporation of advanced architectural features in a microprocessor design without sacrificing legacy compatibility. In a fully-occupied instruction set architecture 200, the present invention employs an architecturally specified, yet unemployed, opcode 202 as a indicator tag for an n-bit prefix that follows, thus allowing microprocessor designers to incorporate up to $2^n$ more recently developed architectural features into an existing microprocessor design, while concurrently retaining complete compatibility with all legacy software.

The present invention exploits the prefix tag/extended prefix concept by providing an n-bit extended store check suppression specifier prefix whereby programmers are enabled to prescribe that store checking be suppressed for a corresponding extended instruction from fetch of the instruction through completion of its execution. An alternative embodiment of the present invention comprehends execution of the extended instruction and a specified number of following instructions to the exclusion of store checking mechanisms in a microprocessor. The present invention will now be discussed with reference to FIGS. 3–10.

Turning to FIG. 3, a block diagram is presented featuring an extended instruction format 300 according to the present invention. Very much like the format 100 discussed with reference to FIG. 1, the extended instruction format 300 has a variable number of instruction entities 301–305, each set to a specified value, that together make up a specific instruction 300 for a microprocessor. The specific instruction 300 directs the microprocessor to perform a specific operation such as adding two operands together, or moving an operand from memory to a register within the microprocessor. Typically, an opcode entity 302 in the instruction 300 prescribes the specific operation to be performed, and optional address specifier entities 303 follow the opcode 302 prescribing additional information about the specific operation such as how the operation is to be performed, registers where the operands are located, direct and indirect data to be used in computation of memory addresses for source/result operands, etc. The instruction format 300 also allows a programmer to prefix an opcode 302 with prefix entities 301 that direct the application of existing architectural features during the execution of the specific operation prescribed by the opcode 302.

The extended instruction 300 according to the present invention, however, is a superset of the instruction format 100 described above with reference to FIG. 1, having two additional entities 304, 305 which are optionally provided as an instruction extension to precede all remaining entities 301–303 in a formatted extended instruction 300. The purpose of the two additional entities 304, 305 is to provide the capabilities for programmers to specify that store checking be suppressed, or precluded for the extended instruction 300 of which the two additional entities 304, 305 are part. The optional entities 304, 305 are an extended instruction tag 304 and an extended store check suppression prefix 305. The extended instruction tag 305 is an otherwise architecturally specified opcode within a microprocessor instruction set. In an x86 embodiment, the extended instruction tag 304, or escape tag 304, is opcode state F1H, the formerly used ICE BKPT instruction. The escape tag 304 indicates to microprocessor logic that the extended prefix 305, or extended features specifier 305, follows, where the extended prefix 305 prescribes suppression of store checking for the extended instruction 300. In one embodiment, the escape tag 304 indicates that accompanying parts 301–303 of a corresponding instruction 300 prescribe an operation to be performed by the microprocessor. The store check suppression specifier 305, or extended prefix 305, specifies that the operation be performed without performing store checking for the extended instruction 300. Extended execution logic in the microprocessor executes the operation, but the operation is executed exclusive of any store checking.

To summarize the selective store check suppression technique according to the present invention, an extended instruction is configured to prescribe an operation to be performed according to an existing microprocessor instruction set, where execution of the instruction is to be accomplished exclusive of store checking. The extended instruction includes one of the opcodes/instructions 304 in the existing instruction set and an n-bit extended prefix 305. The selected opcode/instruction serves as an indicator 304 that the instruction 300 is an extended features instruction 300 (that is, it prescribes extensions to the microprocessor architecture), and the n-bit features prefix 305 indicates that store checking is to be suppressed. In one embodiment, the extended prefix 305 is 8-bits in size, providing for the specification of store check suppression for the instruction and up to 255 following instructions or a combination of store check suppressions for the instructions and a group of n following instructions along with other extended features specified by remaining values of the 8-bit extended prefix 305. An n-bit prefix embodiment provides for the specification of up to $2^n$ store check suppressions or combinations like those above.

Now turning to FIG. 4, a table 400 is presented showing how store check suppression specifications are mapped to logic states of bits in an 8-bit extended prefix embodiment according to the present invention. Similar to the opcode map 200 discussed with reference to FIG. 2, the table 400 of FIG. 4 presents an exemplary 8-bit extended prefix map 400 that associates up to 256 values of an 8-bit extended prefix entity 305 with corresponding store check suppressions of a number of instructions 401 (e.g., E34, E4D, etc.) in a conforming microprocessor. In the case of an x86 embodiment, the 8-bit extended feature prefix 305 according to the present invention serves to provide for instruction-level control of store check suppression 401 (i.e., E00-EFF) which cannot be otherwise specified by the current x86 instruction set architecture.

The extended features 401 shown in FIG. 4 are depicted generically rather than specifically because the technique according to the present invention is applicable to a variety of different architectural extensions 401 and specific instruction set architectures. One skilled in the art will appreciate that many different architectural features 401, including those noted above, can be incorporated into an existing instruction set according to the escape tag 304-extended prefix 305 technique described herein. The 8-bit prefix embodiment of FIG. 4 provides for up to 256 different features 401, however, an n-bit prefix embodiment can allow for programming of up to $2^n$ different features 401.

Now referring to FIG. 5, a block diagram is presented illustrating a pipeline microprocessor 500 for performing selective store check suppression operations according to the present invention. The microprocessor 500 has three notable stage categories: fetch, translate, and execute. The fetch stage has fetch logic 501 that retrieves instructions from memory 503. The retrieved instructions are provided to extended pre-fetch logic 502. The extended pre-fetch logic 502 performs store checking on incoming instructions and is configured to detect instructions having a store check suppression sequence of escape tag and extended prefix as described above with reference to FIGS. 3 and 4. Store checked instructions are synchronized as described above, cached in an instruction cache 504, and provided to an instruction queue 505 for access by translation logic 506. The translation logic 506 is coupled to a micro instruction queue 508. The translation logic 506 includes extended translation logic 507. The execute stage has execution logic 509 having extended execution logic 510 therein.

In operation, the fetch logic 501 retrieves formatted instructions according to the present invention from the memory 503, and routes these instructions through the extended pre-fetch logic 502. The pre-fetch logic 502 performs store checking and initiates synchronization of incoming instructions if they are affected by pending store events in later stages of the pipeline. If an extended instruction according to the present invention is detected, then the extended pre-fetch logic 502 allows the extended instruction to pass through to the instruction cache 504 and instruction queue 505 exclusive of store checking. Fetched instructions are provided to the instruction queue 505 in execution order. The instructions are retrieved from the instruction queue 505 and are provided to the translation logic 506. The translation logic 506 translates each of the provided instructions into a corresponding sequence of micro instructions that directs the microprocessor 500 to perform the operations prescribed by the instructions. The extended translation logic 507 detects those instructions having an extended prefix tag according to the present invention and also provides for translation of corresponding extended store check suppression prefixes. In an x86 embodiment, the extended translation logic 507 is configured to detect an extended prefix tag of value F1H, which is the x86 ICE BKPT opcode. Extended micro instruction fields are provided in the micro instruction queue 506 to allow for the prescription store checking suppression for operations prescribed by accompanying parts of the instruction. Alternative embodiments of the extended translation logic 507 allow for prescription of store check suppression in the extended micro instruction fields for a first instruction according to the present invention and a specified number of following instructions.

The micro instructions are provided from the micro instruction queue 508 to the execution logic 509, wherein the extended execution logic 509 is configured to execute specified operations prescribed by micro instructions and to check the destination addresses of pending stores against the IP locations of all instructions in preceding pipeline stages. If a pending store's destination address corresponds to an IP location in a preceding stage, and the extended micro instruction field for the instruction in the preceding stage does not prescribe store checking suppression, then the extended execution logic 510 initiates a pipeline flush up through the preceding stage and allows the pending store to post. Following completion of the store event, the pipeline is refilled. If, however, the extended micro instruction field for the instruction in the preceding stage prescribes store checking suppression, then the extended execution logic 510 precludes initiation of the pipeline flush. Thus, tagged instructions are allowed to proceed through execution without being flushed due to a store event in a following stage that would otherwise cause a pipeline synchronization flush and refill.

One skilled in the art will appreciate that the microprocessor 500 described with reference to FIG. 5 is a simplified representation of a present day pipeline microprocessor 500. In fact, a present day pipeline microprocessor 500 comprises upwards to 20–30 pipeline stages. However, these stages can be generally categorized into those three stage groups shown in the block diagram and thus, the block diagram 500 of FIG. 5 serves to teach the essential elements that are required to implement embodiments of the present invention as described hereinabove. Those elements of a microprocessor 500 which are extraneous to the present discussion, for clarity, are not depicted nor discussed.

Turning now to FIG. 6, a block diagram is presented featuring an exemplary embodiment of an extended prefix 600 for prescribing store check suppression for a corresponding extended instruction in a microprocessor according to the present invention. The store check suppression prefix 600 is 8-bits in size and includes a suppression field 601. In one embodiment, the suppression field 601 prescribes that store checking be precluded for the corresponding extended instruction. An alternative embodiment comprehends the suppression field specifying preclusion of store checking for the corresponding extended instruction and up to 255 following instructions. The number of instructions with checking suppressed is indicated by the suppression field.

Figure 7:
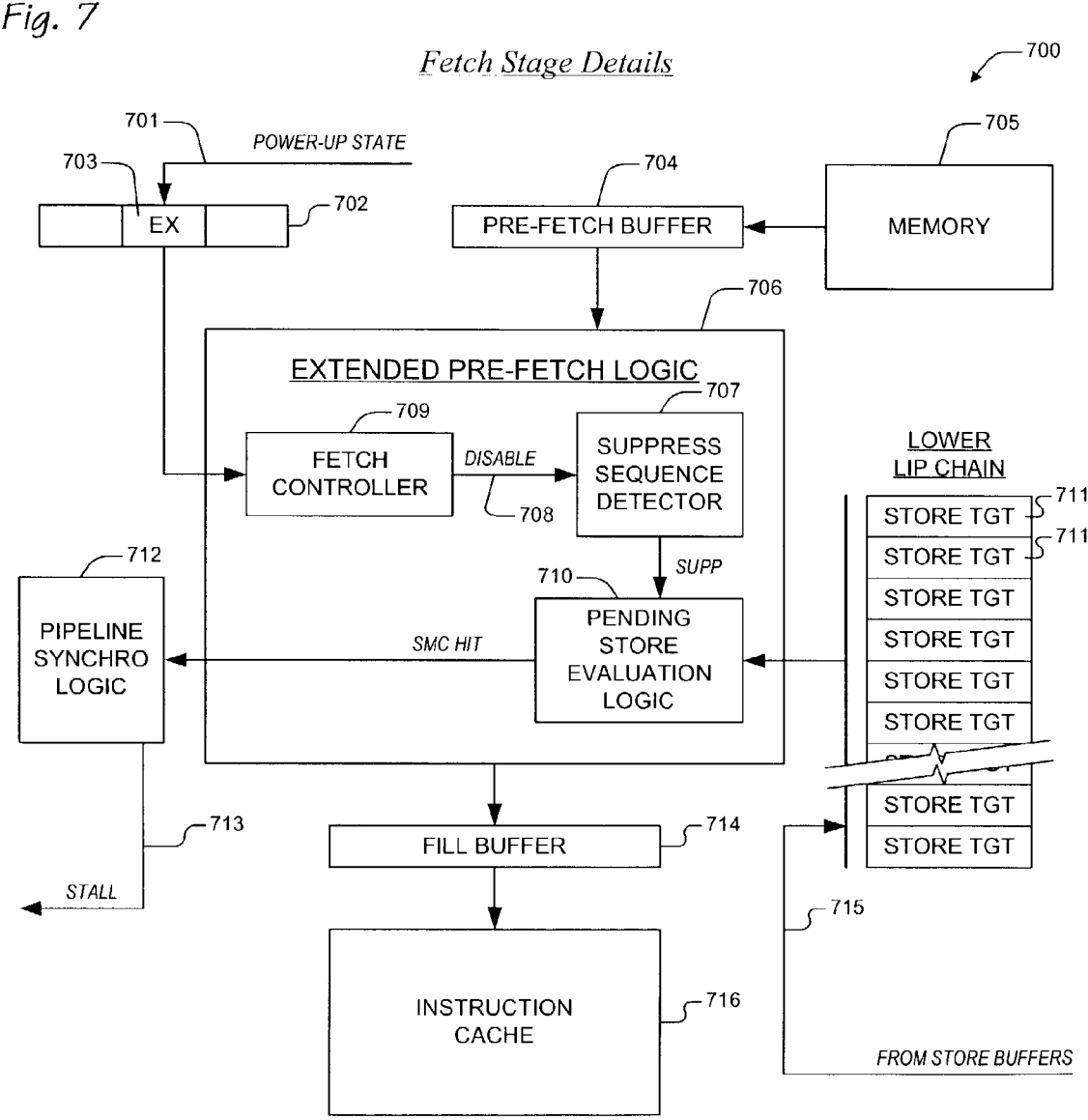
FIG. 7 is a block diagram featuring details of fetch stage logic within the microprocessor of FIG. 5.

Referring to FIG. 7, a block diagram is presented illustrating details of fetch stage logic 700 within the microprocessor of FIG. 5. The fetch stage logic 700 includes a pre-fetch buffer 704 that is coupled to memory 705. The pre-fetch buffer 704 provides pre-fetched instructions to extended pre-fetch logic 706. The extended pre-fetch logic 706 has a fetch controller 709 that is coupled to a suppress sequence detector 707 via a disable signal 708. The fetch controller 709 is also coupled to a machine specific register 702 that has an extended features field 703. The suppress sequence detector provides a control signal, SUPP, to pending store evaluation logic 710. The pending store evaluation logic 710 accesses a plurality of registers 711 containing the destination addresses of pending store events. The plurality of registers 711 is referred to in one embodiment as a lower linear instruction pointer (LIP) chain. The registers 711 are updated with the destination addresses from store buffers (e.g., write combine buffers, write back buffers, etc.) in the pipeline via bus 715. The pending store evaluation logic 710 is coupled to pipeline synchronization logic 712 via signal SMC HIT. The pipeline synchronization logic 712 provides a control signal, STALL, to pipeline control logic (not shown). The extended pre-fetch logic 716 provides fetched instructions to a fill buffer 714, which is coupled to an instruction cache 716.

In operation, as cache lines are retrieved from memory 705, they are provided to the pre-fetch buffer 704. The extended pre-fetch logic 706 retrieves the contents of the cache lines and, among other functions, checks the IP address of incoming instructions against the destination addresses of pending store operations as reflected in the lower LIP chain of registers 711. If the pending store evaluation logic determines that a pre-fetched instruction's IP address corresponds to a pending store target in the registers 711, then signal SMC HIT is asserted, thus causing the pipeline synchronization logic 712 to assert signal STALL, which initiates a pipeline synchronization event. Accordingly, the pipeline is stalled until the pending store posts its data and the fetched instruction is again fetched and is allowed to proceed. If the fetched instruction's IP address does not correspond to any store target, then the extended pre-fetch logic 706 provides it to the fill buffer 714, and ultimately to the instruction cache 716.

The suppress sequence detector 707 also evaluates the contents of the cache lines from the pre-fetch buffer 704 to detect an escape tag/extended prefix sequence that directs suppression of store checking. If the sequence is detected, then signal SUPP is asserted, thus directing the pending store evaluation logic 710 to preclude evaluation of the lower LIP chain registers 711 and to allow the corresponding extended instruction to proceed to the fill buffer 714.

During power-up of the microprocessor, the state of the extended field 703 within the machine specific register 702 is established via signal power-up state 701 to indicate whether the particular microprocessor is capable of processing extended instructions according to the present invention for suppressing store checking in the microprocessor. In one embodiment, the signal 701 is derived from a feature control register (not shown) that reads a fuse array (not shown) configured during fabrication of the part. The machine specific register 702 provides the state of the extended features field 703 to the fetch controller 709 and other logic described herein below. The fetch control logic 709 controls whether or not cache line data from the pre-fetch buffer 704 is evaluated to detect store check suppression sequences. Such a control feature is provided to allow supervisory applications (e.g., BIOS) to enable/disable extended execution features of the microprocessor. If extended features are disabled, then instructions having the opcode state selected as the extended features tag would be checked against pending store events as would any other instruction. The fetch controller 709 directs the suppress sequence detector 707 to disable extended sequence detection by asserting signal DISABLE 708.

Figure 8:
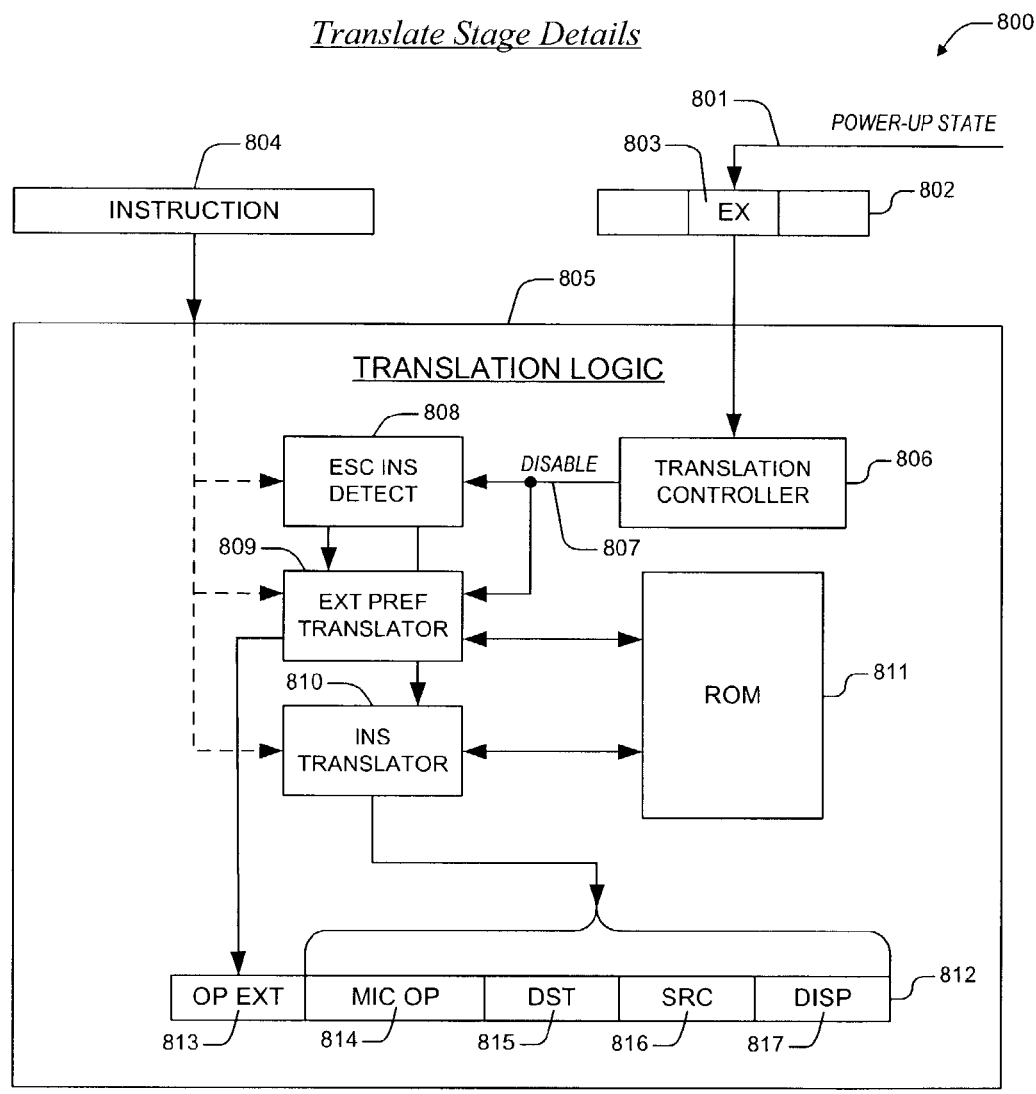
FIG. 8 is a block diagram illustrating details of translate stage logic within the microprocessor of FIG. 5.

Referring to FIG. 8, a block diagram is presented featuring details of translate stage logic 800 within the microprocessor of FIG. 5. The translate stage logic 800 has an instruction buffer 804 that provides an extended instruction to translation logic 805. The translation logic 805 is coupled to a machine specific register 802 having an extended features field 803 as described above with reference to FIG. 7. The translation logic 805 has a translation controller 806 that provides a DISABLE signal 807 to an escape instruction detector 808 and an extended prefix translator 809. The escape instruction detector 808 is coupled to the extended translator 809 and to an instruction translator 810. The extended translation logic 809 and the instruction translation logic 810 access a control read-only memory (ROM) 811, wherein are stored template micro instruction sequences that correspond to some extended instructions. The translation logic 805 also has a micro instruction buffer 812 having an opcode extension field 813, a micro opcode field 814, a destination field 815, a source field 816, and a displacement field 817.

Operationally, during power-up of the microprocessor, the state of the extended field 803 within the machine specific register 802 is established via signal power-up state 801 to indicate whether the particular microprocessor is capable of translating and executing extended instructions according to the present invention as described above with reference to FIG. 8. The machine specific register 802 provides the state of the extended features field 803 to the translation controller 806. The translation control logic 806 controls whether or not instructions from the instruction buffer 804 are translated according to extended translation rules or according to conventional translation rules. If extended features are disabled, then instructions having the opcode state selected as the extended features tag would be translated according to the conventional translation rules. In an x86 embodiment having opcode state F1H selected as the tag, an occurrence of F1H under conventional translation would result in an illegal instruction exception. With extended translation disabled, the instruction translator 810 would translate all provided instructions 804 and would configure all fields 813–817 of the micro instruction 812. Under extended translation rules, however, occurrence of the tag would be detected by the escape instruction detector 808. The escape instruction detector 808 would direct the extended prefix translator 809 to translate the extended prefix portion of the extended instruction according to extended translation rules and to configure the opcode extension field 813, thus directing that store checking be suppressed for the micro instruction sequence corresponding to the extended instruction. The instruction translator 810 would translate to remaining parts of the extended instruction and would configure the micro opcode field 814, source field 816, destination field 815, and displacement field 817 of the micro instruction 812. Certain instructions would cause access to the control ROM 811 to obtain corresponding micro instruction sequence templates. Configured micro instructions 812 are provided to a micro instruction queue (not shown) for subsequent execution by the processor.

Figure 9:
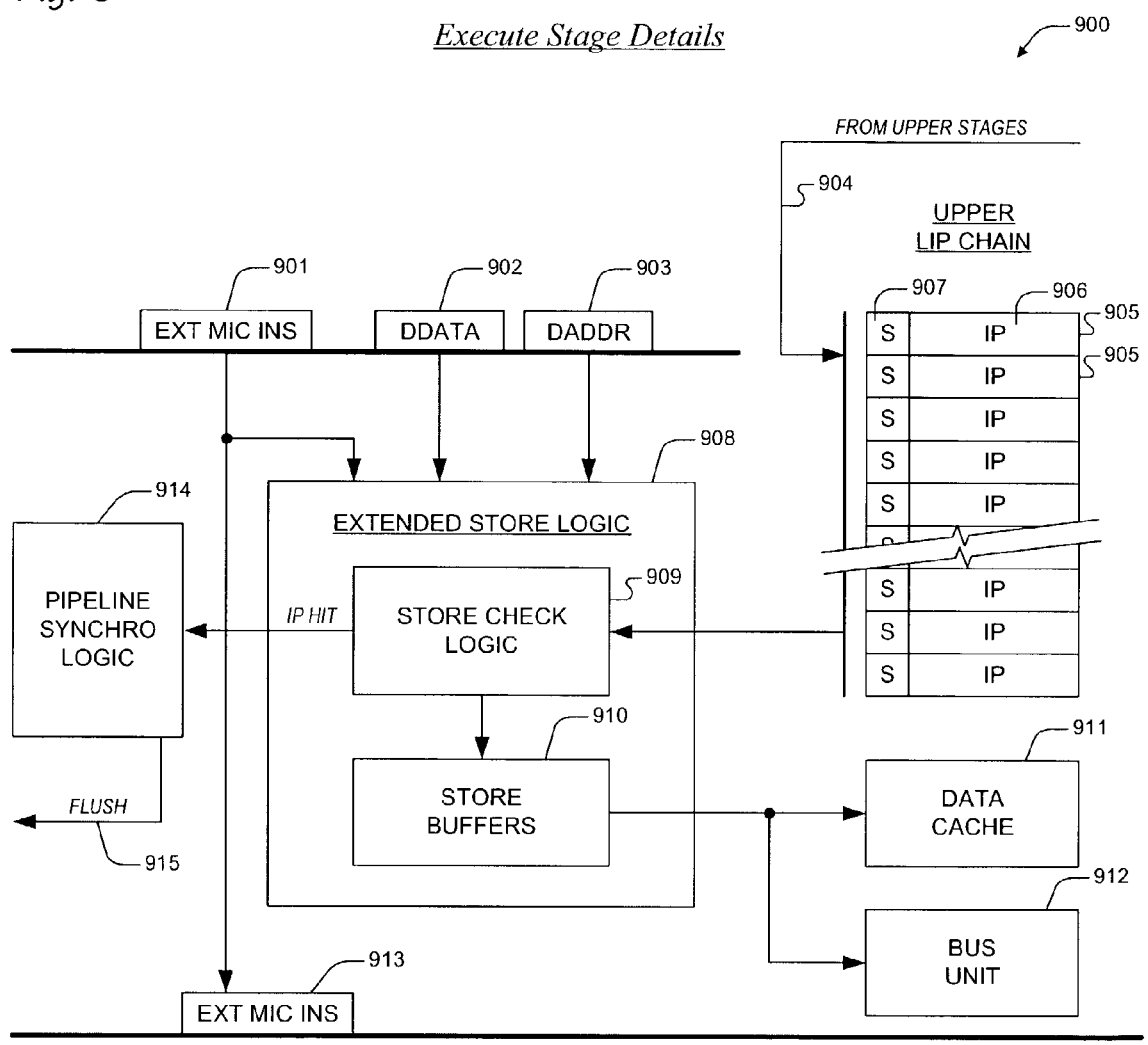
FIG. 9 is a block diagram illustrating details of execute stage logic within the microprocessor of FIG. 5.

Now referring to FIG. 9, a block diagram is presented illustrating execute stage logic 900 within the microprocessor of FIG. 5. The execute stage logic 900 has extended store logic 908 that is coupled to a data cache 911 and a bus unit 912. The bus unit 912 is employed to conduct memory transactions over a memory bus (not shown). From a previous stage of a microprocessor according to the present invention, the extended store logic 908 receives micro instructions from an extended micro instruction buffer 901, a data operand from data buffer 902, and a destination address operand from address buffer 903. The extended store logic 1005 includes store check logic 909 that is coupled to a plurality of linear IP registers 905, to pipeline synchronization logic 914 via signal IP HIT, and to a plurality of store buffers 910. The plurality of linear IP registers 905 are known as the upper LIP chain and each register 905 has an IP field 906 and a suppress store check field 907. The contents of the upper LIP chain 905 comprise the virtual addresses of instructions resident in preceding pipeline stages, in order, and the contents are provided to the chain 905 from the preceding pipeline stages via bus 904.

In operation, the extended store logic 908 is employed to write operands to cache 911 or memory via the bus unit 912 as directed by micro instructions provided in the extended micro instruction buffer 901. For write/store operations directed by extended micro instructions, the store check logic 909 receives destination address information for the operation from the address buffer 903 along with the operand to be stored from buffer 902. The store check logic provides the address and data to the store buffers 910 while concurrently evaluating the contents of the upper LIP chain 905 to determine if there is an instruction in the pipeline whose virtual IP address 906 corresponds to the destination address of the pending store. If a corresponding virtual IP address 906 is found in the upper LIP chain 905, then the store check logic 910 evaluates the associated store check suppress field 907. If the contents of the associated field 907 indicate that store checking is to be suppressed, then the store check logic 909 allows pipeline activity to continue uninterrupted. The contents of the store buffers 910 are posted to cache 911 or memory via the bus unit 912 in accordance with memory traits prescribed for the store event as dictated by processor-specific architectural conventions. If, however, the store check logic 909 does not determine that store checking is to be suppressed for a corresponding virtual IP address 906, then signal IP HIT is asserted, signaling the pipeline synchronization logic 914 to initiate a pipeline flush/re-fill up through the stage where the corresponding virtual IP address 906 was detected. The pipeline synchronization logic 914 thus initiates the pipeline synchronization event via signal FLUSH 915. As instructions are processed, the extended micro instructions are provided to micro instruction register 913 in synchronization with a pipeline clock (not shown).

To summarize significant aspects of the present invention as has been described above with reference to FIGS. 3–9, a programmable tag-prefix combination is provided for in an extended instruction by employing an architecturally defined, yet obsolete, opcode as the tag. In one embodiment, the prefix directs a conforming microprocessor to suppress store checking only for the extended instruction. In a different embodiment, the prefix directs the conforming microprocessor to suppress store checking for the extended instruction and a specified number of following instructions. When the extended instruction is fetched, extended pre-fetch logic according to the present invention detects the tag-prefix combination and allows the extended instruction to proceed into the processor's instruction cache exclusive of any store checking against pending store events. Extended translation logic indicates that store checking is to be suppressed for the instruction's corresponding micro instruction sequence via contents of opcode extension fields in extended micro instructions according to the present invention. The contents of the opcode extension fields are reflected in store check suppression fields in upper LIP chain registers so that when a store event is processed by extended store logic, synchronization events are not initiated for those extended instructions that have specified suppression of store checking.

Consequently, programmers and/or automated code compilation devices are provided with a mechanism for directing a conforming microprocessor to suppress store checking for single instructions or groups of instructions, thereby overcoming pipeline synchronization flushes due to interlaced code and data within the same cache line and also providing a more flexible means to implement algorithms comprising self-modifying code.

Figure 10:
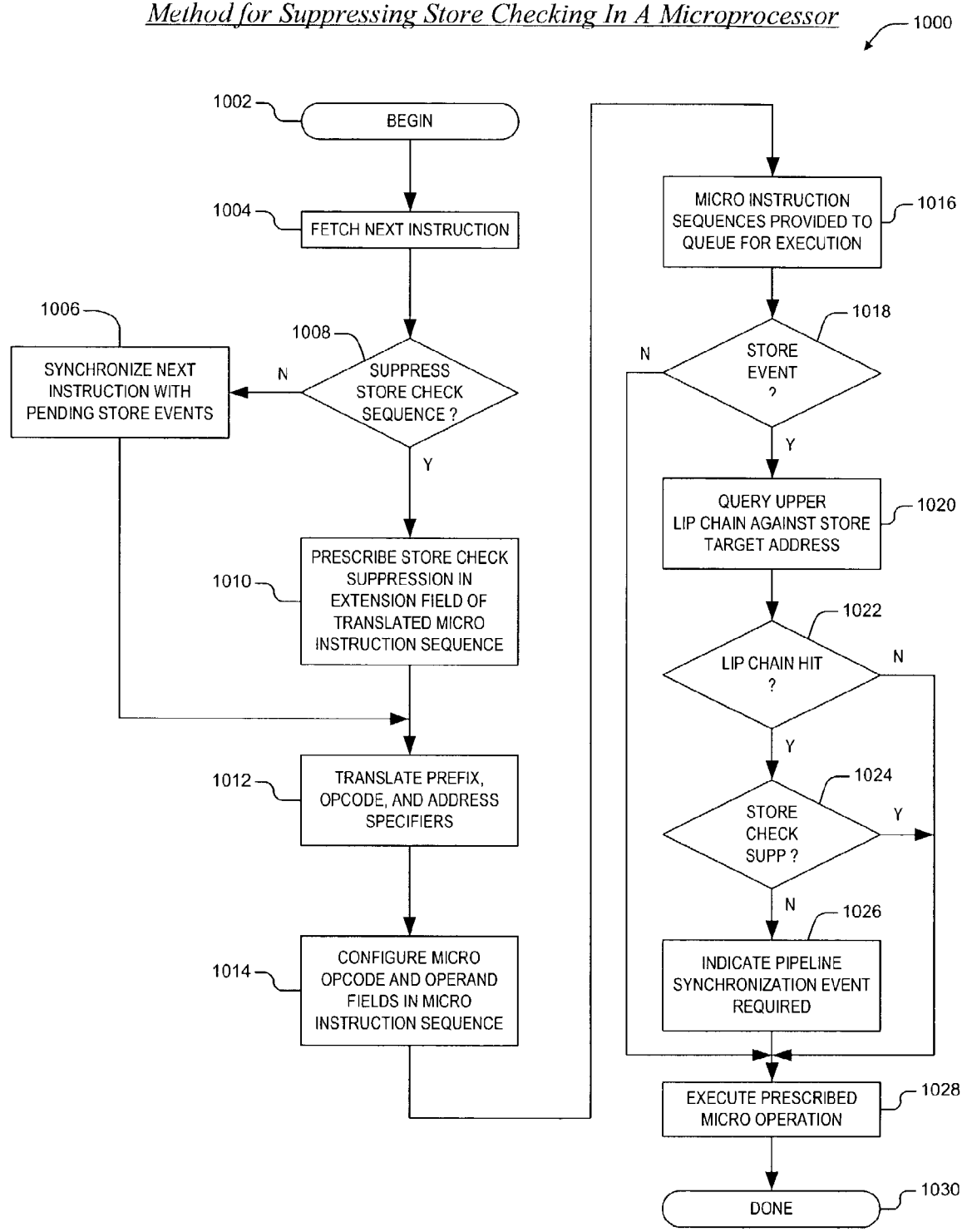
FIG. 10 is a flow chart depicting a method for suppressing store checking associated with an instruction in a microprocessor according to the present invention.

Now referring to FIG. 10, a flow chart 1000 is presented depicting a method for fetching, translating, and executing instructions that enable a programmer to override store checking processes within a microprocessor at the instruction level. Flow begins at block 10023 wherein a program configured with extended feature instructions is provided to the microprocessor. Flow then proceeds to block 1004.

At block 1004, a next instruction is fetched for entry into the microprocessor's pipeline. Flow then proceeds to decision block 1008.

At decision block 1008, the instruction fetched in block 1004 is evaluated to determine if an extended escape code-extended prefix sequence is provided for the instruction. In an x86 embodiment, the evaluation is made to detect opcode value F1 (ICE BKPT) followed by a suppress store checking specifier entity. If the extended escape code and following entity are detected, then flow proceeds to block 1010. If the escape code and extended specifier are not detected, then flow proceeds to block 1006.

At block 1006, the instruction fetched in block 1004 is synchronized with pending store events. The targets of the pending store events are evaluated to determine if any of them correspond to the virtual address of the fetched instruction. If so, then the pipeline is stalled and the pending store events are allowed to complete. Following completion, the fetched instruction is re-fetched from memory and flow proceeds to block 1012.

At block 1008, an extended prefix part of the extended instruction is translated to prescribe that store checking be suppressed for a corresponding micro instruction sequence as the micro instruction sequence proceeds through the pipeline. Prescription of store check suppression is provided for by configuring an extended micro opcode field according to the present invention. Flow then proceeds to block 1012.

At block 1012, all remaining parts of the instruction are translated to determine a prescribed operation, register operand locations, memory address specifiers, along with the application of existing architectural features prescribed by prefixes according to the existing instruction set architecture. Flow then proceeds to block 1014.

At block 1014, an extended micro instruction sequence is configured to specify the prescribed operation along with its corresponding opcode extensions. Flow then proceeds to block 1016.

At block 1016, micro instruction sequences, including the extended micro instruction sequence configured in block 1014 are provided in execution order as they are processed by translation apparatus to a micro instruction queue for execution by the microprocessor. Flow then proceeds to decision block 1018.

At decision block 1018, a next micro instruction sequence is retrieved by extended execution logic according to the present invention. The extended execution logic evaluates the next micro instruction sequence to determine if a store event is specified. If not, then flow proceeds to block 1028. If so, then flow is directed to block 1020.

At block 1120, since a store event has bee specified, store checking logic queries an upper LIP chain according to the present invention. Flow then proceeds to decision block 1022.

At decision block 1022, an evaluation is made to determine if the destination address of the store event corresponds to any virtual IP addresses of instructions that follow the store event in the pipeline. If a corresponding virtual IP address is found within the LIP chain, then flow proceeds to decision block 1024. If not, then flow proceeds to block 1028.

At decision block 1024, a store check suppression field associated with the found virtual IP address is evaluated to determine if store checking is to be suppressed for the associated instruction. If so, then flow proceeds to block 1028. If not, then flow proceeds to block 1026.

At block 1026, the extended execution logic indicates that a pipeline synchronization event is required for the associated instruction. Flow then proceeds to block 1028.

At block 1028, the operation prescribed by the next micro instruction sequence is executed. Flow then proceeds to block 1030

At block 1030, the method completes.

Although the present invention and its objects, features, and advantages have been described in detail, other embodiments are encompassed by the invention as well. For example, the present invention has been described in terms of a technique that employs a single, unused, opcode state within a completely full instruction set architecture as a tag to indicate that an extended feature prefix follows. But the scope of the present invention is not limited in any sense to full instruction set architectures, or unused instructions, or single tags. On the contrary the present invention comprehends instruction sets that are not entirely mapped, embodiments having used opcodes, and embodiments that employ more than one instruction tag. For example, consider an instruction set architecture where there are no unused opcode states. One embodiment of the present invention comprises selecting an opcode state that is presently used as the escape tag, where the selection criteria is determined according to market-driven factors. An alternative embodiment comprehends employing a peculiar combination of opcodes as the tag, say back-to-back occurrences of opcode state 7 FH. The essential nature of the present invention thus embodies use of a tag sequence followed by an n-bit extension prefix that allows a programmer/compiler to specify suppression of store checking for individual or groups of instructions in an existing microprocessor instruction set.

In addition, although a microprocessor setting has been employed to teach the present invention and its objects, features, and advantages, one skilled in the art will appreciate that its scope extends beyond the boundaries of microprocessor architecture to include all forms of programmable devices such as signal processors, industrial controllers, array processors, and the like.

Those skilled in the art should appreciate that they can readily use the disclosed conception and specific embodiments as a basis for designing or modifying other structures for carrying out the same purposes of the present invention, and that various changes, substitutions and alterations can be made herein without departing from the spirit and scope of the invention as defined by the appended claims.

What is claimed is:

1. An apparatus, providing for instruction level control of store checking within a microprocessor, the apparatus comprising:
    a fetch unit, for receiving an extended instruction, wherein said extended instruction comprises:
        an extended prefix, for specifying that store checking be suppressed for said extended instruction; and
        an extended prefix tag, wherein said extended prefix tag is an otherwise architectural opcode within an existing instruction set;
    wherein said fetch unit precludes store checking for pending store events associated with said extended instruction; and
    a translation logic, coupled to said fetch unit, for translating said extended instruction into a micro instruction sequence, said micro instruction sequence directing the microprocessor to exclude store checking during execution of a prescribed operation.

2. The apparatus as recited in claim 1, wherein said extended instruction further comprises instruction entities according to said existing instruction set.

3. The apparatus as recited in claim 2, wherein said instruction entities specify said prescribed operation to be executed by the microprocessor, and wherein store checking would otherwise be performed during execution of said prescribed operation.

4. The apparatus as recited in claim 3, wherein, if a store event is detected prior to completing execution of a particular instruction wherein a destination address of said store event corresponds to the location of said particular instruction, a store check unit would otherwise flush said particular instruction and all subsequently fetched instructions from the microprocessor, and would re-fetch instructions beginning at the location of said particular instruction following completion of said store event.

5. The apparatus as recited in claim 1, wherein said fetch unit comprises:
    an extended pre-fetch unit, configured to detect said extended prefix and said extended prefix tag, and configured to enable said extended instruction to pass through to said translation logic without checking for said pending store events.

6. The apparatus as recited in claim 5, wherein a pending store evaluation unit otherwise evaluates preceding instructions the pipeline of the microprocessor to detect said pending store events, and if a destination address of said pending store events is found that corresponds to the location of a fetched instruction, then said store check unit would stall execution of said fetched instruction to allow said destination address to be updated.

7. The apparatus as recited in claim 1, wherein said extended prefix comprises 8 bits.

8. The apparatus as recited in claim 1, wherein said extended prefix comprises:
    a suppress field, for specifying that store checking associated with said extended instruction be suppressed.

9. The apparatus as recited in claim 1, wherein said extended prefix comprises:
    a suppress field, for specifying that store checking associated with said extended instruction and a prescribed number of following instructions be suppressed.

10. The apparatus as recited in claim 1, wherein said existing instruction set comprises the x86 instruction set.

11. The apparatus as recited in claim 1, wherein said extended prefix tag comprises opcode F1 (ICE BKPT) in the x86 instruction set.

12. The apparatus as recited in claim 1, wherein said translation logic comprises:
    an escape instruction detection unit, for detecting said extended prefix tag;
    an instruction translation unit, for determining said prescribed operation, and for specifying said prescribed operation within said micro instruction sequence; and
    an extended translation unit, coupled to said escape instruction detection unit and said instruction translation unit, for prescribing within said micro instruction sequence that store checking be excluded during execution of said prescribed operation.

13. A microprocessor mechanism, for extending an existing instruction set to provide for selective suppression of store checking within a microprocessor pipeline, the microprocessor mechanism comprising:
    an extended instruction, configured to prescribe that store checking associated with said extended instruction be suppressed, wherein said extended instruction comprises a selected opcode in the existing instruction set followed by an n-bit extended prefix, said selected opcode indicating said extended instruction, and said n-bit extended prefix indicating suppression of store checking; and
    a translator, configured to receive said extended instruction, and configured to generate a micro instruction sequence directing a microprocessor to execute a prescribed operation, and to preclude store checking associated with execution of said prescribed operation.

14. The microprocessor mechanism as recited in claim 13, wherein said extended instruction further comprises:
    remaining instruction entities, configured to specify said prescribed operation.

15. The microprocessor mechanism as recited in claim 13, wherein said n-bit prefix comprises:
    a suppression field, configured to specify that store checking associated with said extended instruction be suppressed.

16. The microprocessor mechanism as recited in claim 13, wherein said n-bit prefix comprises:
    a suppression field, configured to specify that that store checking associated with said extended instruction and a prescribed number of following instructions be suppressed.

17. The microprocessor mechanism as recited in claim 13, wherein said n-bit extended prefix comprises 8 bits.

18. The microprocessor mechanism as recited in claim 13, wherein the existing instruction set is the x86 microprocessor instruction set.

19. The microprocessor mechanism as recited in claim 13, wherein said selected opcode comprises opcode ICE BKPT (i.e., opcode F1) in the x86 microprocessor instruction set.

20. The microprocessor mechanism as recited in claim 13, wherein said translator comprises:
   an escape instruction detector, for detecting said selected opcode within said extended instruction;
   an instruction translator, for translating remaining parts of said extended instruction to determine said prescribed operation; and
   an extended prefix translator, coupled to said escape instruction detector and said instruction translator, for translating said n-bit extended prefix, and for specifying suppression of store checking within said micro instruction sequence.

21. The microprocessor mechanism as recited in claim 13, further comprising:
   an extended fetch unit, for receiving said extended instruction from memory, for detecting said selected opcode and said n-bit extended prefix, and for allowing said extended instruction to pass to said translator exclusive of performing a check for pending store events corresponding to the location of the extended instruction.

\* \* \* \* \*